US012804106B2

(12) United States Patent
Chun

(10) Patent No.: US 12,804,106 B2
(45) Date of Patent: Nov. 17, 2026

(54) METHOD TO SET VIDEO RECORDING BASED ON AREA AND A SYSTEM FOR THE SAME

(71) Applicants: HYUNDAI MOTOR COMPANY, Seoul (KR); KIA CORPORATION, Seoul (KR)

(72) Inventor: Sang Woo Chun, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/923,364

(22) Filed: Oct. 22, 2024

(65) Prior Publication Data

US 2025/0142026 A1 May 1, 2025

(30) Foreign Application Priority Data

Nov. 1, 2023 (KR) ........................ 10-2023-0149011

(51) Int. Cl.

| | |
|---|---|
| ***H04N 7/18*** | (2006.01) |
| ***G01S 19/13*** | (2010.01) |
| ***G06V 20/40*** | (2022.01) |
| ***G06V 20/56*** | (2022.01) |
| ***H04N 5/76*** | (2006.01) |

(52) U.S. Cl.

CPC ............. *H04N 7/188* (2013.01); *G01S 19/13* (2013.01); *G06V 20/41* (2022.01); *G06V 20/44* (2022.01); *G06V 20/56* (2022.01); *H04N 5/76* (2013.01)

(58) Field of Classification Search

CPC .......... H04N 7/188; H04N 5/76; G06V 20/41; G06V 20/44; G06V 20/56; G01S 19/13

See application file for complete search history.

(56) References Cited

U.S. PATENT DOCUMENTS 7,239,760 B2 * 7/2007 Di Bernardo ...... G01C 21/3848 348/113
2021/0232340 A1 * 7/2021 Ito ......................... G06F 3/0653

FOREIGN PATENT DOCUMENTS

JP 2009123165 A * 6/2009 ............... G07C 5/00

* cited by examiner

*Primary Examiner* — Mishawn N. Hunter
(74) *Attorney, Agent, or Firm* — Lempia Summerfield Katz LLC

(57) ABSTRACT

An area-based video recording setting method includes setting at least two classified areas based on geographic navigation information, setting an activation state of video recording for each of the classified areas, acquiring location information of a vehicle based on the navigation information and global positioning system (GPS) location information, and determining whether the acquired location information corresponds to a location in the classified areas. In response to a determination that the location is in the classified areas, the video recording is performed according to the set activation state of the video recording.

18 Claims, 2 Drawing Sheets

METHOD TO SET VIDEO RECORDING BASED ON AREA AND A SYSTEM FOR THE SAME

CROSS-REFERENCE TO RELATED APPLICATION

This application claims the benefit of and priority to Korean Patent Application No. 10-2023-0149011, filed on Nov. 1, 2023, the entire contents of which are incorporated herein by reference.

BACKGROUND

Technical Field

The present disclosure relates to an area-based video recording setting method and system.

Discussion of Related Art

A vehicle accident recording device, or an event data recorder (EDR), which is generally referred to as a black box or dash cam for a vehicle, may be a device configured to record videos of situations occurring inside and/or outside of a vehicle while the vehicle is traveling or parked. A vehicle accident recording device may also conveniently record video footage before and after a collision (or event) and provide information necessary to determine the circumstances of the collision (event).

The EDR described above was initially provided only as an after-market or add-on external device but has now been provided as a built-in or integrated device in a vehicle as being embedded or installed (e.g., by a vehicle manufacturer) before the release or sale of the vehicle.

Such a built-in EDR may be more effective than an external or after-market EDR in that it may access the driving data of a host vehicle and is linked to other controllers to, for example, check the speed or seatbelt-wearing state of the vehicle, provide multi-functionality having a navigation function, a high-pass function, or an emergency signal function in case of emergency. Accordingly, use or inclusion of a built in EDR is on the rise.

In addition, while the external or after-market EDR has an image-acquiring camera that has a field of view only in a forward direction, the built-in EDR may have cameras that capture views in various directions (e.g., with different fields of view) including, for example, one-channel (forward viewing), two-channel (forward and backward viewing), and four-channel (forward, backward, leftward, and rightward viewing) cameras, according to a user requirement or option (e.g., the number of cameras). Multi-channel viewing is gaining attention in connection with autonomous driving.

In addition, the EDR may record therein entries, such as, for example, the speed of a vehicle, a brake operating state of the vehicle, revolutions per minute (RPM) of an engine, a position or operating state of an accelerator pedal, a throttle valve operating state, a steering wheel angle, a seatbelt-wearing state, a crash severity (or delta-V or acceleration), a tire pressure, a gear position, airbag deployment data, and the like.

In this case, since a quantity of data of recorded videos is large, if the EDR is not in a 24-hour always-on storage mode selected by a user, videos or images acquired from cameras of the EDR may be stored temporarily only for 15 seconds to 5 minutes using a buffer in a first in first out (FIFO) manner. If there is no event (e.g., collision), a temporary storage state may be maintained without storing videos captured 15 seconds to 5 minutes before a current time. In other words, a video may be maximally stored for 6 minutes before an event occurs.

In contrast, if an event occurs, videos stored in the buffer may be recorded and stored. In this case, a recorded video 15 seconds to 5 minutes before the event occurs, a recorded video at the time in which the event occurs, and a video after the event occurs may be continuously recorded and stored.

Most typical setting methods for video recording in addition to event recording adopt an ON/OFF method. Therefore, although there are various external environments or different regional conditions in the driving and parking situations of a vehicle, these typical methods may not consider such conditions or situations.

For example, in a case where a user desires to turn off recording settings before driving and then change the recording settings to be turned on in a specific situation while driving, the user may need to perform many touch steps while viewing an audio-video-navigation (AVN) screen. However, making such a change while driving may be almost impossible due to safety.

An event-related recording mode of video recording devices that have been developed in various ways to the present day may not be practically set by a user, except for ON/OFF settings for a constant recording function when there is no event, especially in a driving or parking situation, and it may thus be difficult to meet the increasingly diversified needs of users.

SUMMARY OF THE PRESENT DISCLOSURE

An object of the present disclosure is to solve the issues described above.

An object of the present disclosure is to provide a method for setting area-based video recording and a system for area-based video recording that may provide, in addition to a typical ON/OFF recording method, an automatic ON/OFF setting or change in setting and/or recording function based on a location of a vehicle in conjunction with navigation information. If the recording setting based on a location of a vehicle in conjunction with navigation information is inconsistent with the previous setting, the system may apply the automatic setting preferentially.

To solve the preceding technical problems, according to an embodiment of the present disclosure, there is provided a method for setting area-based video recording. The method includes setting at t two classified areas based on geographic navigation information and setting an activation state of video recording for each of the at least two classified areas based on navigation information. The methods includes: acquiring location information of the vehicle based on global positioning system (GPS) location information, determining whether the acquired location information corresponds to a location in one of the at least two classified areas based on geographic navigation information; and in response to a determination that the location is in one of the at least two classified areas, performing video recording according to the set activation state.

According to an embodiment of the present disclosure, setting at least two classified areas based on geographic navigation information includes setting a dangerous area based on the geographic navigation information.

According to an embodiment of the present disclosure, the dangerous area comprises at least one of an area where accidents frequently occur, an animal appearance area, a rockfall area, or a slippery area based on the geographic navigation information.

According to an embodiment of the present disclosure, setting t two classified areas based on geographic navigation information includes setting a protection area based on the geographic navigation information.

According to an embodiment of the present disclosure, the protection area comprises at least one of a children protection zone, a senior protection zone, a pedestrian protection zone, or a wildlife protection zone based on the geographic navigation information.

According to an embodiment of the present disclosure, setting at least two classified areas based on geographic navigation information includes setting a user-specified area which is set by a user.

According to an embodiment of the present disclosure, the user-specified area comprises at least one of a home address area which is related to a home address, a work address area which is related to a work address, and a parking lot address area which is related to a parking lot address.

According to an embodiment of the present disclosure, setting at least two classified areas based on geographic navigation information includes setting a non-specified area for which the activation state is not set.

According to an embodiment of the present disclosure, the non-specified area includes a dangerous area for which the activation state is not set or a protection area for which the activation state is not set.

According to an embodiment of the present disclosure, setting the activation state of the video recording further comprises: for each of the at least two classified areas based on geographic navigation information, setting a constant recording function during parking to be ON or OFF; and for each of the at least two classified areas based on geographic navigation information, setting an event recording function during parking to be ON or OFF.

According to an embodiment of the present disclosure, setting the activation state of the video recording further comprises: for each of the at least two classified areas based on geographic navigation information, setting a constant recording function during driving to be ON or OFF; and for each of the at least two classified based on geographic navigation information, setting an event recording function during driving to be ON or OFF.

According to another embodiment of the present disclosure, an area-based video recording setting system is provided. The system includes: a camera image processing module configured to process a camera image acquired by at least one camera, a global positioning system (GPS) reception module configured to receive a GPS signal and acquire GPS information; and a geographic information display unit configured to acquire navigation information and display the acquired navigation information. The system further includes a recorded video storage module configured to store the camera image processed by the camera image processing module, a recording option setting module configured to set an activation state of video recording inputted by a user for each of at least setting at least two classified areas based on geographic navigation information based on the navigation information, and a control module configured to control the recorded video storage module according to the activation state based on a current location and the navigation information.

In a system according to an embodiment of the present disclosure, the at least two classified areas based on geographic navigation information comprise a dangerous area and a protection area classified based on the navigation information, and a user-specified area which is set by the user.

In a system according to an embodiment of the present disclosure, the at least two classified areas based on geographic navigation information comprise a non-specified area, a dangerous area for which the activation state is not set, or a protection area for which the activation state is not set.

In a system according to an embodiment of the present disclosure, the dangerous area comprises any one of an area where accidents frequently occur, an animal appearance area, a rockfall area, or a slippery area based on the navigation information.

In a system according to an embodiment of the present disclosure, the protection area comprises at least one of a children protection zone, a senior protection zone, a pedestrian protection zone, or a wildlife protection zone based on the navigation information.

In a system according to an embodiment of the present disclosure, the user-specified area comprises at least one of a home address area which is related to a home address, a work address area which is related to a work address, and a parking lot address area which is related to a parking lot address.

In a system according to an embodiment of the present disclosure, the recording option setting module is configured to for each of the at least two classified areas based on geographic navigation information, set a constant recording function during parking or an event recording function during parking to be ON or OFF.

In a system according to an embodiment of the present disclosure, the recording option setting module is configured to for each of the at least two classified areas based on geographic navigation information, set a constant recording function during driving or an event recording function during driving to be ON or OFF.

According to embodiments of the present disclosure described herein, the system to which the area-based video recording setting method is applied may provide a driver with various options other than a simple ON/OFF recording setting. Thus, a driver-specific service may be provided. Additionally, the system may reduce an acquisition rate of unnecessary images that are not to be used to reduce the storage space waste. Additionally, the system may record a parking situation at a location selected by the driver to reduce a usage rate of an auxiliary battery and minimize the power waste.

DETAILED DESCRIPTION

Figure 1:
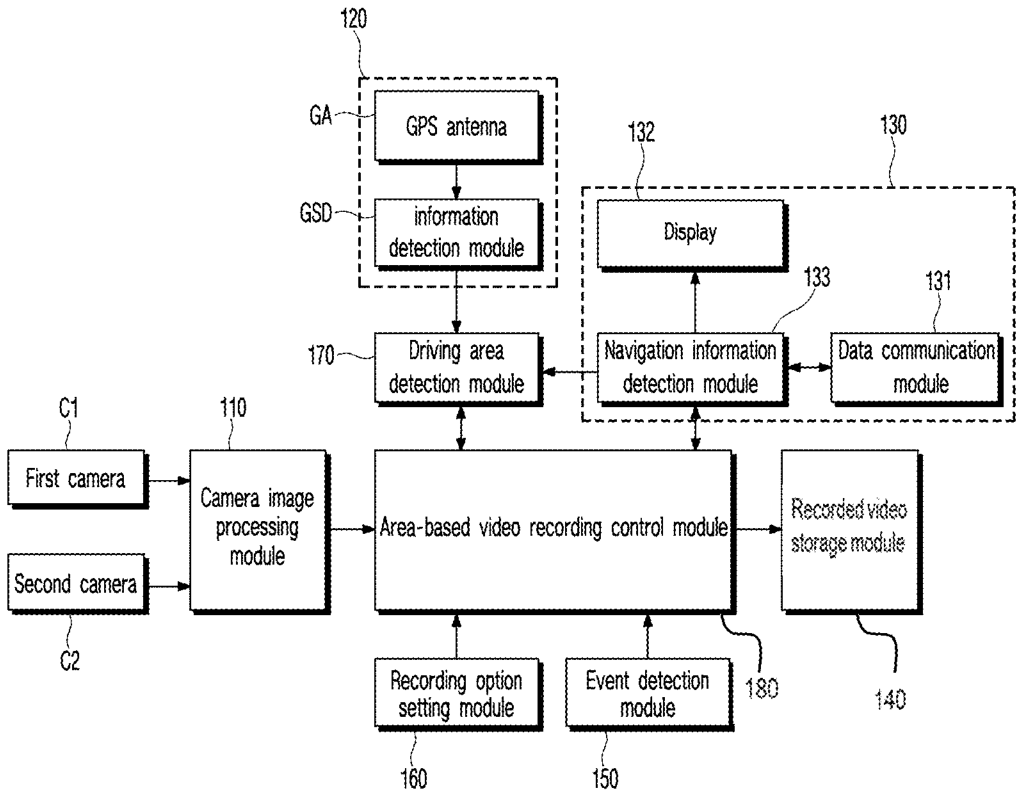
FIG. 1 is a block diagram illustrating an example configuration of a system to which an area-based video recording setting method is applied according to an embodiment of the present disclosure.

Hereinafter, embodiments of the present disclosure are described in detail with reference to the accompanying drawings. The embodiments are not to be construed as limiting the disclosure and should be understood to include all changes, equivalents, and replacements within the idea and the technical scope of the disclosure.

The terms "module," "unit," and/or "-er/or" for referring to elements are assigned and used interchangeably in consideration of the convenience of description, and thus the terms per se do not necessarily have different meanings or functions. The terms "module," "unit," and/or "-er/or" do not necessarily require physical separation.

The term "unit" or "module" used in this specification signifies one unit that processes at least one function or operation, and may be realized by hardware, software, or a combination thereof. The operations of the method or the functions described in connection with the forms disclosed herein may be embodied directly in a hardware or a software module executed by a processor, or in a combination thereof.

Although terms including ordinal numbers, such as "first," "second," and the like, may be used herein to describe various elements, the elements are not limited by these terms. These terms are only used to distinguish one element from another.

The term "and/or" is used to include any combination of multiple items that are subject to it. For example, "A and/or B" may include all three cases, for example, "A," "B," and "A and B."

When an element is described as "coupled" or "connected" to another element, the element may be directly coupled or connected to the other element. However, it is to be understood that another element may be present therebetween. In contrast, when an element is described as "directly coupled" or "directly connected" to another element, it is to be understood that there are no other elements therebetween.

The singular forms "a," "an," and "the" are intended to include the plural forms as well, unless the context clearly indicates otherwise. It is to be further understood that the terms "comprises/comprising" and/or "includes/including" used herein specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein. When a component, device, element, or the like of the present disclosure is described as having a purpose or performing an operation, function, or the like, the component, device, or element should be considered herein as being "configured to" meet that purpose of perform that operation or function.

In addition, the term "unit" or "control unit" is merely a widely used term for naming a controller that controls a specific vehicle function, and does not mean a generic functional unit. For example, each controller may include a communication device that communicates with another controller or a sensor to control a function assigned thereto, a memory that stores an operating system (OS), a logic command, input/output information, and the like, and one or more processors that perform determination, calculation, decision, and the like that are necessary for controlling a function assigned thereto.

Meanwhile, a processor may include a semiconductor integrated circuit and/or electronic devices that perform at least one or more of comparison, determination, computation, operations, and decision to achieve programmed functions. The processor may be, for example, any one or a combination of a computer, a microprocessor, a central processing unit (CPU), an application-specific integrated circuit (ASIC), and an electronic circuit (e.g., circuitry and logic circuits).

In addition, computer-readable recording media (or simply memory) include all types of storage devices that store data readable by a computer system. The storage devices may include at least one type of, for example, flash memory, hard disk, micro-type memory, card-type (e.g., secure digital (SD) card or extreme digital (XD) card) memory, random-access memory (RAM), static RAM (SRAM), read-only memory (ROM), programmable ROM (PROM), electrically erasable PROM (EEPROM), magnetic RAM (MRAM), magnetic disk, or optical disc.

This recording medium may be electrically connected to the processor. The processor may load and record data from the recording medium. The recording medium and the processor may be integrated or may be physically separated.

Hereinafter, an area-based video recording setting method and system according to embodiments of the present disclosure are described in detail with reference to the accompanying drawings.

FIG. 1 is a block diagram illustrating an example configuration of a system to which an area-based video recording setting method is applied according to an embodiment of the present disclosure. The system may include at least one camera (e.g., a first camera C1 and a second camera C2) provided in a vehicle; a camera image processing module 110 configured to process camera images acquired from the camera (C1, C2); a global positioning system (GPS) reception module 120 configured to acquire GPS information by receiving a GPS signal; and a geographic information display unit 130 configured to acquire navigation information through data communication with a navigation management server and display the acquired navigation information. The system may further include a recorded video storage module 140 configured to record and store the camera images processed by the camera image processing module 110 according to a control signal; an event detection module 150 configured to detect an event (e.g., an impact or vibration at a predetermined threshold level or greater) occurring in the vehicle; and a driving area detection module 170 configured to identify a current driving area by comparing the information acquired by the GPS reception module 120 and the information acquired by the geographic information display unit 130. The system may further include a recording option setting module 160 configured to allow a user to set whether to activate the recorded video storage module 140 when the vehicle is located in an area classified as a dangerous area, a protection area, or a user-specified area based on the information acquired by the geographic information display unit 130; and an area-based video recording control module 180 configured to recognize a current location of the vehicle by receiving a signal detected by the driving area detection module 170 and the information acquired from the geographic information display unit 130. The area-based video recording control module 180 may control the recorded video storage module 140 based on a recording option set by the user through the recording option setting module 160.

It is noted that each of the modules described above may be implemented by a memory in which a program for performing a corresponding function is stored and a processor configured to execute the program. The respective memories of the modules may be integrated into one or more memories and the respective processors of the modules may be integrated into one or more processors.

Figure 2:
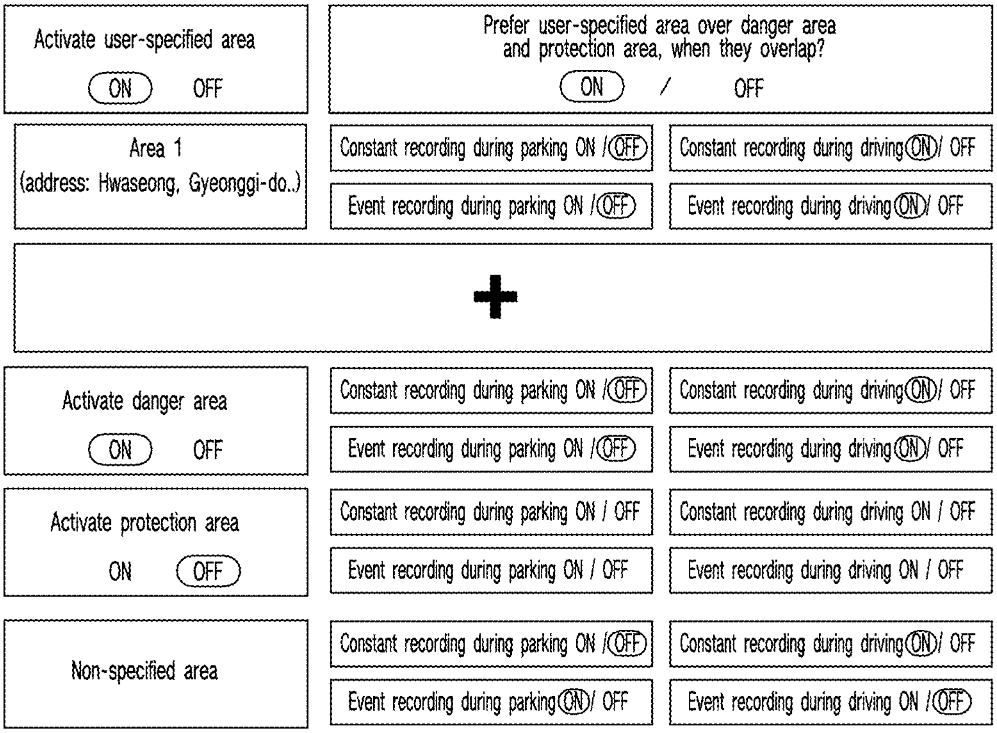
FIG. 2 is a diagram illustrating an example configuration of a user settings menu of a recording option setting module in the configuration shown in FIG. 1.

FIG. 2 is a diagram illustrating an example configuration of a user settings menu of a recording option setting module in the configuration shown in FIG. 1 or another configuration. In this example, the settings menu is broadly divided into a user-specified area, a danger area, and a protection area. A non-specified area is also included.

The user-specified area may allow a driver (or the user) of the vehicle to specify an area for which they desire to use video recording settings for their personal needs. For example, it may allow the driver to specify a home where they reside, a workplace or office where they work, or a parking lot they frequently use.

In addition, the danger area or dangerous area may allow the driver to set separate recording settings for a dangerous area of which a navigation system warns the driver, such as, for example, an area where accidents frequently occur, an animal appearance area, a rockfall area, a slippery area, or the like based on the information acquired from the geographic information display unit 130.

In addition, the protection area may allow the driver to set separate recording settings for a protected area of which the navigation system warns the driver, such as, for example, a children protection zone (e.g., school zone), a senior protection zone, a pedestrian protection zone, a wildlife protection zone, or the like.

In addition, the non-specified area may refer to a remaining space or area other than the user-specified area, the danger area, or the protection area as described above. For example, in a case where the user selects OFF for the activation of (e.g., for an activation state of) the protection area as shown in FIG. 2, the protected area will be treated the same as (e.g., set as corresponding to) the non-specified area because there are no separate settings for the protection area on a map.

In addition, the non-specified area may always be activated, but the driver may set ON/OFF for the details of the video recording.

Therefore, before driving, the driver may set an activation state (e.g., ON, OFF) of a recording function through the recording option setting module 160 based on their driving habit or driving route, as shown in FIG. 2. However, it is noted that examples of recording settings are not limited to what is shown in FIG. 2.

When the vehicle starts driving, the GPS reception module 120 may receive a GPS signal through a GPS antenna (GA) included in the GPS reception module 120, and may acquire information about a current location of the vehicle that is currently driving through a GPS information detection module (GSD).

The driving area detection module 170 may then recognize the current location of the vehicle based on the GPS signal.

Further, the driving area detection module 170 may acquire navigation information through a navigation information detection module 133 included in the geographic information display unit 130.

In this way, the driving area detection module 170 may recognize the current location at which the vehicle is currently driving based on a location of the GPS information in the navigation information.

In this case, the area-based video recording control module 180 may receive the current location of the vehicle recognized by the driving area detection module 170 and determine whether it corresponds to an area for which the activation of the recording function is set by the recording option setting module 160.

For example, as shown in FIG. 2, when the driver sets ON for the activation of (e.g., as an activation state of) the recording function for the danger area or dangerous area, and the current location is a rockfall area which is a danger area, the area-based video recording control module 180 may determine whether the vehicle is currently driving or parked because the recording function is set to OFF in a parked state but ON in a driving state, and when the driving state is determined, may control the recorded video storage module 140 based on an constant recording mode during driving and an event recording mode during driving until the vehicle leaves the danger area to record and store an output image signal of the camera image processing module 110 configured to process images acquired by the camera (C1, C2).

Subsequently, when the current location of the vehicle is outside of the danger area, the constant recording mode may be turned OFF, and the recording mode may be switched to a control state in which recording is performed only when an event occurs, as shown in FIG. 2.

The system configured to implement the area-based video recording setting method according to embodiments of the present disclosure may operate as described above. The system may provide a service tailored to the characteristics and/or preferences of each driver by providing various options to a driver rather than a simple ON/OFF recording settings. Additionally, the system may reduce wasted storage space by reducing an acquisition rate of unnecessary videos that are not to be used. In addition, the system may perform recording (e.g., only) while the vehicle is parked at a location selected by a driver to reduce the usage of an auxiliary battery and minimize the power waste.

While several embodiments of the present disclosure have been shown and described above, it should be apparent to one of ordinary skill in the art that various modifications or changes in form and detail may be made to these embodiments without departing from the spirit and scope of the claims and their equivalents.

What is claimed is:

1. A video recording method for a vehicle, the method comprising:

setting, based on an input provided by a user, at least two classified areas based on geographic navigation information;

setting an activation state of video recording for each of the at least two classified areas;

acquiring location information of the vehicle based on global positioning system (GPS) location information;

determining whether the acquired location information corresponds to a location in one of the at least two classified areas based on geographic navigation information, wherein the at least two classified areas include a default area defined as a remaining region for which the activation state is not set; and according to a determination that the location is in one of the at least two classified areas, performing video recording according to the activation state set for the classified area.

2. The method of claim 1, wherein the at least two classified areas further include a dangerous area based on the geographic navigation information.

3. The method of claim 2, wherein the dangerous area comprises at least one of an area where accidents frequently occur, an animal appearance area, a rockfall area, or a slippery area based on the geographic navigation information.

4. The method of claim 1, wherein the at least two classified areas further include a protection area based on the geographic navigation information.

5. The method of claim 4, wherein the protection area comprises at least one of a children protection zone, a senior protection zone, a pedestrian protection zone, or a wildlife protection zone based on the geographic navigation information.

6. The method of claim 1, wherein the at least two classified areas further include a user-specified area which is set by a user.

7. The method of claim 6, wherein the user-specified area comprises at least one of a home address area which is related to a home address, a work address area which is related to a work address, or a parking lot address area which is related to a parking lot address.

8. The method of claim 1, wherein a region corresponding to a dangerous area or a protection area for which the activation state is not set is treated as part of the default area.

9. The method of claim 1, wherein setting the activation state of the video recording further comprises:

for each of the at least two classified areas, setting a constant recording function during parking to be ON or OFF; and for each of the at least two classified areas, setting an event recording function during parking to be ON or OFF.

10. The method of claim 1, wherein setting the activation state of the video recording further comprises:

for each of the at least two classified areas, setting a constant recording function during driving to be ON or OFF; and for each of the at least two classified areas, setting an event recording function during driving to be ON or OFF.

11. A video recording system for a vehicle, the system comprising:

a camera image processing module configured to process a camera image acquired by at least one camera;

a global positioning system (GPS) reception module configured to receive a GPS signal and acquire GPS information;

a geographic information display unit configured to acquire navigation information and display the acquired navigation information;

a recorded video storage module configured to store the camera image processed by the camera image processing module;

a recording option setting module configured to set an activation state of video recording for each of at least two classified areas based on the navigation information, wherein the at least two classified areas are set based on an input provided by a user, and wherein the at least two classified areas include a default area defined as a remaining region for which an activation state is not set; and a control module configured to control the recorded video storage module according to the activation state based on a current location and the navigation information.

12. The system of claim 11, wherein the at least two classified areas comprise a dangerous area and a protection area classified based on the navigation information, and a user-specified area which is set by the user.

13. The system of claim 12, wherein a region corresponding to the dangerous area or the protection area for which the activation state is not set is treated as part of the default area.

14. The system of claim 12, wherein the dangerous area comprises any one of an area where accidents frequently occur, an animal appearance area, a rockfall area, or a slippery area based on the navigation information.

15. The system of claim 12, wherein the protection area comprises at least one of a children protection zone, a senior protection zone, a pedestrian protection zone, or a wildlife protection zone based on the navigation information.

16. The system of claim 12, wherein the user-specified area comprises at least one of a home address area which is related to a home address, a work address area which is related to a work address, and a parking lot address area which is related to a parking lot address.

17. The system of claim 11, wherein the recording option setting module is configured to:

for each of the at least two classified areas, set a constant recording function during parking or an event recording function during parking to be ON or OFF.

18. The system of claim 11, wherein the recording option setting module is configured to:

for each of the at least two classified areas, set a constant recording function during driving or an event recording function during driving to be ON or OFF.

* * * * *